US008868613B2

(12) United States Patent
Piira et al.

(10) Patent No.: US 8,868,613 B2
(45) Date of Patent: Oct. 21, 2014

(54) UPDATING DATA ON A REMOTE DEVICE

(75) Inventors: Antti Piira, San Francisco, CA (US); Rupen Chanda, San Francisco, CA (US); Brian Connolly, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1798 days.

(21) Appl. No.: 11/945,261

(22) Filed: Nov. 26, 2007

(65) Prior Publication Data
US 2009/0138477 A1 May 28, 2009

(51) Int. Cl.
*G06F 17/00* (2006.01)
*H04L 29/08* (2006.01)
*G06F 17/30* (2006.01)

(52) U.S. Cl.
CPC .......... *G06F 17/30174* (2013.01); *H04L 67/34* (2013.01); *G06F 17/30017* (2013.01)
USPC .......................................... 707/802; 707/809

(58) Field of Classification Search
USPC ............................ 707/10, 100, 200, 802, 809
See application file for complete search history.

(56) References Cited

U.S. PATENT DOCUMENTS

| | | | |
|---|---|---|---|
| 2003/0081695 A1* | 5/2003 | Eilts et al. ..................... | 375/316 |
| 2003/0125047 A1* | 7/2003 | Chen et al. .................... | 455/456 |
| 2005/0188078 A1* | 8/2005 | Kotzin et al. ................. | 709/224 |
| 2006/0089152 A1* | 4/2006 | Mahonen .................. | 455/456.1 |
| 2007/0130331 A1 | 6/2007 | Kao et al. | |
| 2007/0198698 A1* | 8/2007 | Boyd et al. .................... | 709/224 |
| 2007/0268852 A1* | 11/2007 | Stegmaier et al. ............ | 370/328 |
| 2009/0110030 A1* | 4/2009 | Kennedy et al. .............. | 375/130 |

OTHER PUBLICATIONS

Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.

* cited by examiner

*Primary Examiner* — Apu Mofiz
*Assistant Examiner* — Fariborz Khoshnoodi
(74) *Attorney, Agent, or Firm* — Shook, Hardy & Bacon L.L.P.

(57) ABSTRACT

Systems and methods, including computer software products, for updating data on a remote device involve defining multiple channels on a remote device, where each channel is associated with a predetermined type of content. Content updates for the channels are automatically delivered to the remote device, and an update frequency is identified for each channel. A most frequent update frequency among the multiple channels defined on the remote device is determined, and updates to the channels are requested according to the most frequent update frequency.

20 Claims, 2 Drawing Sheets

UPDATING DATA ON A REMOTE DEVICE

BACKGROUND

The present disclosure relates to updating data in computer systems in general and more specifically relates to updating data in mobile information systems. In a mobile information system, subscribers may register with a wireless service provider to receive various types of content from the service provider on their mobile devices. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Many different types of content are provided to mobile devices equipped with such application environments, and the content may need to be refreshed or updated at different points in time. Sometimes updates are "pulled" from a server to a client, meaning content is sent to and stored on the mobile device when requested by a user of the mobile device. Sometimes updates are "pushed" from a server to a client, meaning content is sent to and stored on the mobile device even when the update has not been requested by the mobile device.

SUMMARY

This specification describes technologies relating to memory allocation in a mobile or other remote device.

In general, one aspect of the subject matter described in this specification can be embodied in a method that includes defining multiple channels on a remote device, for which each channel is associated with a predetermined type of content. Content updates for the channels are automatically delivered to the remote device, and an update frequency for each channel is identified. A most frequent update frequency among the multiple channels defined on the remote device is determined, and updates to the multiple channels are requested according to the most frequent update frequency. Other embodiments of this aspect include corresponding systems, apparatus, and computer program products.

These and other embodiments can optionally include one or more of the following features. The update frequency for at least one channel is automatically adjusted based on the content. Updates to the channels are requested by sending an update request to a remote server according to the most frequent update frequency. A next update time corresponding to the most frequent update frequency is identified, and a message is received at the remote device to send an update request for at least one channel before the next update time. The content updates are automatically delivered to the remote device in response to automatically sending the update request according to the most frequent update frequency. The multiple channels are selected from a plurality of available channels and the multiple channels are defined on the remote device by registering the remote device to receive content updates for each of the multiple channels. A timestamp is provided for each of the channels, and the timestamp identifies a most recent update to the channel. A determination of whether content updates are available for each of the channels is based on the timestamp. Multiple update frequencies for at least one of the channels is identified, and each of the multiple update frequencies corresponds to a different condition. The most frequent update frequency is modified or updated based on the identified update frequencies. The content updates can be adapted for storage in a data storage on the mobile device for selective retrieval by a user of the mobile device. New content can be received from an external source, and a content update for at least one channel can be generated based on the new content.

Particular embodiments of the subject matter described in this specification can be implemented to realize one or more of the following advantages. Content provided to a mobile device in a mobile information system may be efficiently updated. Furthermore, an update frequency or an update time may be determined based on the content provided in the update and/or a number of other factors.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

When a computer system, such as a mobile information system, is configured to provide content to a user device, such as a mobile device, the computer system may update or refresh data on the user device. In a mobile information system, subscribers may register with a wireless service provider to receive various types of content from the service provider on their mobile devices. Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF (small web format) binary vector graphics format. SWF provides a compact, TAG-based, easily extendible format that supports streaming, bitmap and vector graphics, and scripting. Content may include other data or files, such as a feature film, an executable software update, or a software extension.

In some implementations, wireless service providers deliver content to the mobile devices of their subscribers in the form of information channels. Each information channel may originate with the wireless service provider or may originate with third party content providers. When a subscriber subscribes to a particular information channel, the wireless service provider delivers content associated with that information channel to the subscriber's mobile device. The content may be delivered as a channel feed to a file system (i.e., a feed store) located on the mobile device. The feed store may be logically divided into separate compartments or memory allocations with each channel assigned its own compartment on a static or dynamic basis. Periodically, the wireless service provider may deliver channel content updates to the mobile device. The updates may be provided according to a predetermined schedule, in response to a request from the mobile device, in response to an availability of updates at the content provider, in response to an expiration or consumption (e.g., viewing) of content previously delivered to the mobile device or in some other way. Because the channel content is stored locally on the mobile device and frequently updated, the subscriber is usually able to access the channel without having to wait for channel content or content updates to be delivered over the network. The channel content may be automatically delivered to the mobile device in the background (i.e., without a specific user request and/or while the mobile device is otherwise idle or being used to view other channels or perform other operations).

For example, a wireless service provider may offer several different information channels to its subscribers. Some information channels may be freely available to all subscribers, while other information channels may require premium subscriber status. The content of some information channels may originate with the wireless service provider. The content of other information channels may originate with third parties that have registered with the service provider. The content of still other information channels may originate with other sources. The offered information channels may include a premium news channel. If a subscriber has subscribed to the premium news channel, then the wireless service provider may establish a channel feed to periodically or sporadically deliver content from the premium news channel to the feed store located on the subscriber's mobile device. When the subscriber accesses the premium news channel, processes on the mobile device retrieve the content from the feed store. Even if the subscriber rarely or even never accesses the premium news channel, the channel feed may provide for regular updates of channel content in the feed store based, for example, on an expiration of content and/or an availability of new content.

An update frequency for updating channel content may be associated with each channel. While each channel may have its own associated update frequency, the mobile information system may determine a single time interval for updating all channels on a particular mobile system. The single time interval for updating all channels may be based on the update frequencies of all channels subscribed to by the mobile device. For example, the most frequent update frequency of all of the subscribed channels may be used to determine a time or time intervals at which to update all channels on the mobile device. In some instances, content may not be updated at the nominal update time or update time interval, for example, due to an interruption in network connectivity or power loss at the nominal update time. In such an instance, content may be updated at a different time, for example, when the mobile device reestablishes connectivity. An update time interval can be equivalently discussed as an update frequency. An interval is a quantity with units of time, such as "seconds" or "hours." A frequency is a quantity with units of inverse time, such as "per hour" or "per second" (i.e. Hertz). For the purposes of this disclosure, the terms "update frequency" and "update interval" may be used interchangeably, and it will be understood that update frequency refers to a number of updates per unit time and update interval refers to an amount of time between updates.

The update frequency for a given channel and/or the update time interval for updating all channel content on a mobile device may be determined by a content provider, a server, the mobile device, or any other entity included in the mobile information system. The update frequency for a given channel and/or the update time interval for updating all channel content on a mobile device may be determined based on update or channel content, user preferences, server or network volume, network bandwidth, update availability, and/or other factors such as time of day. For example, an update frequency may be based on an identification of an update type, size and/or data format, or based on the actual content of an update. In some implementations, the server may determine the update interval or update time for updating all data on a mobile device. All channel data may be updated at once, for example in the background, allowing a user to later browse the data without having to wait for updates. A content update interval may depend on content, allowing the data stored on a mobile device to be updated more frequently at times when the updates are more frequently available and/or relevant. For example, a channel Stock Quotes may have no updates during certain hours of the evening and/or night, so a long update interval (e.g. 10 hours) may be assigned to the channel Stock Quotes during the evening and/or night hours. During business hours, however, the update interval for the channel Stock Quotes much shorter (e.g. 300 seconds), according to, for example, user preferences or content provider recommendations.

Channel content may be in the form of text, images, vector graphics, bitmaps, frame-based animation, video, or in any other format supported by the mobile information system, and may include executable scripts or other sequences of instructions. Depending on the format of the channel content, an application running on the mobile device, such as a media player or other type of media player component, may be invoked to run the script, execute the instructions, or otherwise display the content. One example of such a mobile information system is described in U.S. patent application Ser. No. 10/791,298, filed Mar. 1, 2004 and entitled "MOBILE RICH MEDIA INFORMATION SYSTEMS," the entire contents of which are hereby incorporated by reference.

Figure 1:
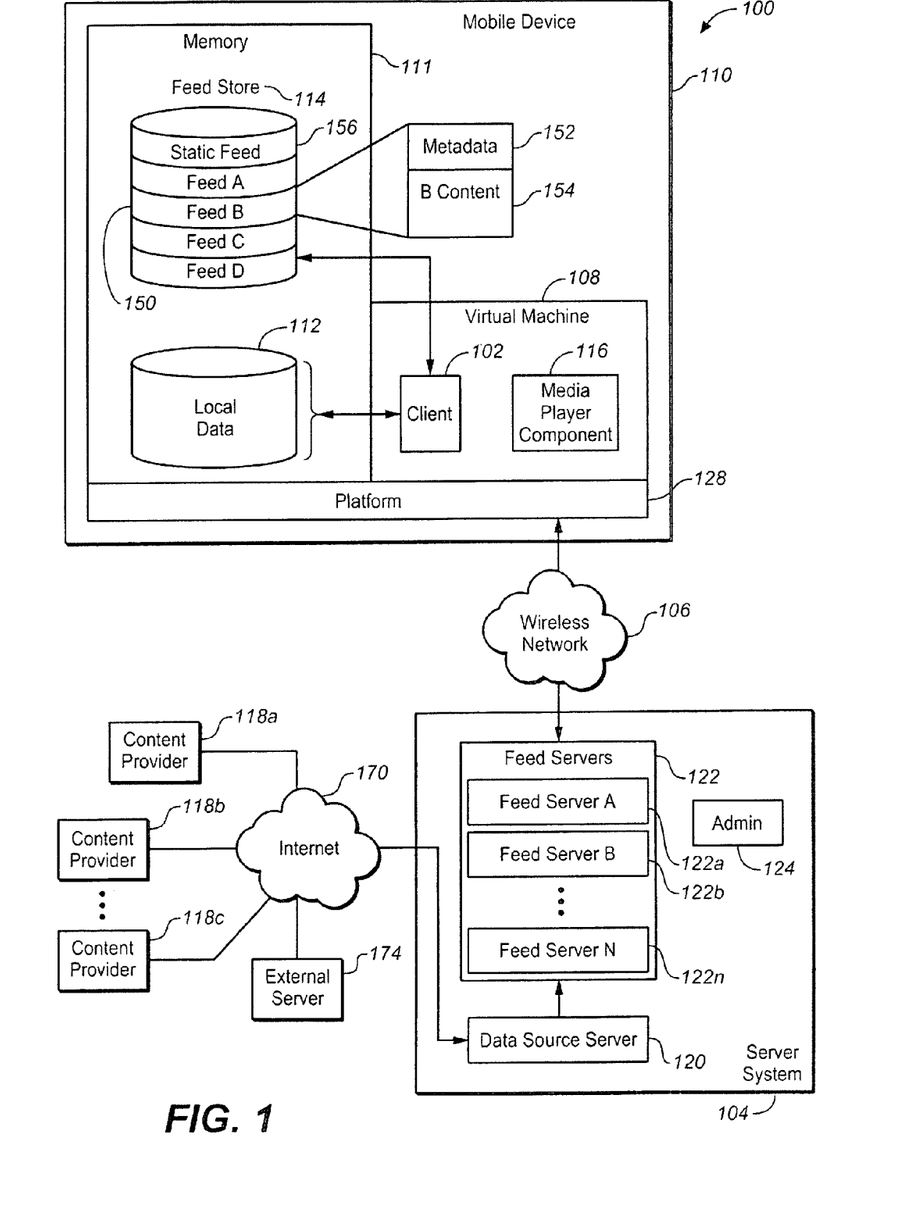
FIG. 1 is an illustration of an example mobile information system in accordance with some aspects of the present disclosure.

FIG. 1 illustrates an example system 100 for providing system security by associating permissions with content. System 100 represents a mobile information system for delivering mobile data services to mobile device 110. The mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device suitable to receive content over wireless network 106. Mobile device 110 includes memory 111 that may be accessed by the various components of the mobile device 110. The memory 111 is configured to store information including local data 112 and feed store 114. Local data 112 may include user preferences, a call log, contacts, and favorites, as well as various other types of local data (e.g., settings and preferences, calendar appointments and reminders, task lists, and the like). User preferences may represent a user's preferred settings, which may include a preferred time or time interval for updating content. A call log may represent calls recently initiated or received by mobile device 110. Contacts may represent a subscriber's associates and may include names, home and business addresses, phone numbers, email addresses, and other information related to the subscriber's associates. Favorites may represent the phone numbers associated with the subscriber's calling plan. Call log, contacts, and favorites represent examples of data that may be stored as local data 112 on mobile device 110. Individual implementations may include none, some, or all of these examples, in addition to other types of local data not discussed.

At a high level, server system 104 may retrieve information from content providers 118, organize the retrieved information along with some or all of any associated memory allocations into individual information channel feeds, and deliver the information channel feeds to client 102. Client 102 may then store the information channel feeds in feed store 114. In addition to the dynamic channel feeds received from server system 104, feed store 114 may also contain one or more static feeds 156. Static feed content and associated permissions may be preloaded on mobile device 110 instead of delivered by server system 104. In addition to providing information, channel feeds may also be used to provide services, such as a home page user interface, calendar user interface and services, or other user interfaces or specialized application services.

In some implementations, a content provider 118 may recommend an update frequency for retrieving updated content for a channel originated by the content provider 118. The recommended update frequency may be sent to the server 104 or included in the channel content, for example in the metadata 152. A recommended update frequency for a channel may be recommended by content provider 118 based on channel content. For example, during times that the channel will have frequently updated content, the service provider may recommend a high update frequency, and when the channel content will be updated infrequently, the service provider may recommend a low update frequency. Furthermore, an update frequency may be automatically adjusted based on content.

When a subscriber attempts to access a particular information channel, for example, channel B 150, client 102 may retrieve channel B content 154 and channel B metadata 152 from feed store 114. Depending on the format of channel B content 154, client 102 may provide channel B content 154 to media player component 116. In some implementations, channel B content 154 is a SWF file and media player component 116 is an Adobe® Flash®-based media player component that provides media player functionality. Client 102 and media player component 116 may form two parts of a single virtual machine 108 running on mobile device 110. The virtual machine 108 may run on a device platform 128. Client 102 and media player component 116 may then be programmed to run on the virtual machine.

In some implementations, the functionality of media player component 116 may be extended. Such an extension may be used to expand the functionality of media player component 116, such as by providing support for additional commands or services. For example, a service provider may wish to provide channel content that displays or otherwise accesses or manipulates data from local data 112 such as a call log. The service provider may develop a custom command or instruction that can be provided in the channel feed and stored in feed store 114. Such a command may be unrecognized by unextended media player component 116 and client 102. The service provider may then install a custom extension on mobile device 110 that recognizes and performs the custom command or instruction, effectively increasing the number of commands or instructions recognized by media player component 116. The extension may be implemented through an application programming interface (API) supported by the client 102, which defines certain types of messages that can be passed between the client 102 and the extension. In another example, a third party content provider may develop a custom command or instruction to perform some other activity. An extension may be a software module that is distributed preinstalled on mobile device 110 or downloaded to mobile device 110, for example over wireless network 106.

Client 102 provides a framework for displaying and managing content received on mobile device 110, including content received from server system 104. Client 102 may be responsible for the caching of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example over wireless network 106.

Client 102 may access media player component 116 to render a user interface and content and to perform scripting operations. In some implementations, media player component 116 is a media player that supports vector graphics, bitmaps, and frame-based animation, as well as text input and dynamic text. Media player component 116 may be able to process files, such as SWF files, in which content providers 118 use native device fonts or embed arbitrary fonts. Media player component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by media player component 116.

Client 102 may be configured to interact with mobile device 110's underlying features and applications through a set of scriptable commands. In some implementations, client 102 may interact with native functions of the mobile device 110 by interfacing with a platform 128 of the mobile device 110. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience.

Mobile device 110 may have a fully customizable user interface design, through feed store 114, that consists of individual Flash® elements (i.e., SWF files) independent of client 102's core functionality. In some implementations, the SWF files enable subscribers to use mobile device 110's soft keys to control navigation and client 102's meta functions such as setting preferences. Feed store 114 may be updated over wireless network 106 and may use an asynchronous communication protocol that updates all content through a background delivery mechanism that is transparent to subscribers. This enables subscribers to continue browsing one information channel, for example, channel B 150, while a different information channel is updated in the background. Subscribers can also change their preferences when offline; the transaction-based client-server protocol may ensure that such requests will be fulfilled the next time client 102 connects to server system 104. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, Palm OS®, Linux, Windows XP®, Mac OS®, and the like.

In some implementations, server 104 or client 102 may be configured to perform one or more tasks to determine a time or a time interval for updating data on the mobile device 110. For example, server 104 or client 102 may determine an update frequency for one or more channels based on user preferences, timestamps, an update log for the mobile device, channel content, or others. A timestamp may indicate when a most recent update was received by the mobile device 110, and the timestamp may also indicate that the most recent update was only partially fulfilled, for example, due to a loss of connectivity. In some implementations the server 104 may determine an update interval or an update time based on the timestamp, for example by comparing the timestamp to an update version. Client 102 may accept an update interval recommended by a content provider 118 or determined by a component of server 104. Server 104 or client 102 may further determine a smallest update interval (i.e. a most frequent or highest update frequency) among the channels to which the mobile device 110 subscribes. The smallest update interval may be used to determine a time for the client 102 to request updates from server 104. In general, server 104 or client 102 may identify a specific time or an update time interval for updating any or all channels on mobile device 110 based on any type of relevant information. Client 102 may also request updates from server 104 over wireless network 106 at an identified update time or at identified update intervals.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into channel content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator 124 providing the functionality required to manage the servers, including channel administration, subscriber administration, and system management. Using administrator 124, service providers can check, for example, the amount of network traffic each channel generates, deactivate poorly performing channels, and dynamically provision, modify, or remove channels, among other tasks. In some implementations, administrator 124 may be configured to perform on or more tasks to determine a time interval for updating data on mobile device 110. To the extent administrator 124 is implemented as one or more partially or fully automated processes, administrator may be incorporated into the server 104. For example, administrator 124 may identify an update frequency for one or more channels, or administrator 124 may accept a recommended update interval from a content provider 118 or from mobile device 110. Administrator 124 may further determine a smallest update interval among the channels to which the mobile device 110 subscribes. The administrator 124 may cause the server 104 to send to mobile device 110 an identification of a single update interval for all channels to which the mobile device 110 subscribes. The single update interval may be the shortest update interval identified by the administrator 124. In general, administrator 124 may identify an update interval for a mobile device based on any type of relevant information. An update interval may be determined by administrator 124 based on, for example, timestamps for the channels indicating a most recent update time, an update log for the mobile device, channel content, or others.

In some embodiments of the system 100, content providers 118 may recommend update frequencies for channels and include an identification of the recommended update frequency in data sent to server 104. Server 104 may receive data (e.g. from client 102 or from internet 170) identifying a list of channels to which mobile device 110 subscribes. Server 140 may then identify the channel on the subscription list with the highest (or most frequent) recommended update frequency. Administrator 124 may use the highest recommended update frequency to determine an update interval for all channel content on the mobile device 110. An identification of the update interval determined by administrator 124 may be included in data transmitted to client 102. Client 102 may then determine a time at which to request updates from server 104 based on the transmitted identification. At the determined time, client 102 may send a request to server 104 for updates. In response to the request, server 104 may send updates to client 102.

When client 102 receives a content update from server system 104 via the channel feed, client 102 stores both the channel content and the metadata associated with the content in feed store 114. For example, when client 102 receives a content update for Channel B, client 102 updates Channel B feed 150 in feed store 114. Both Channel B content 154 and the associated Channel B metadata 152 are stored. Channel B feed 150 may be updated multiple times before a subscriber ever accesses it. When a subscriber accesses Channel B through the mobile device 110 user interface, client 102 may retrieve Channel B content 154 (e.g., a SWF file) and Channel B metadata 152 and provide both to media player component 116 (e.g., a media player).

Figure 2:
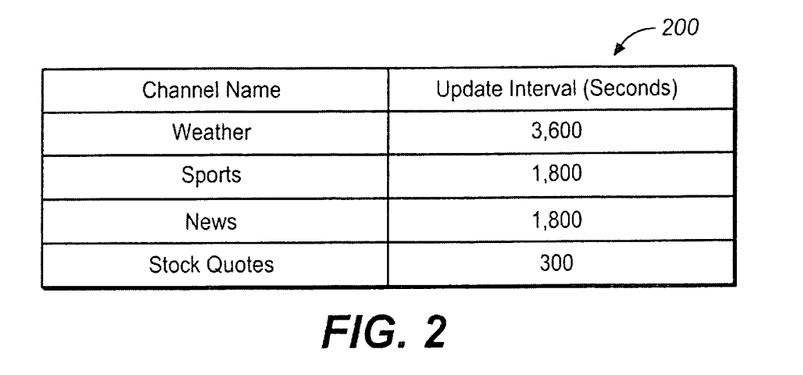
FIG. 2 is a table illustrating example channel information in accordance with some aspects of the present disclosure.

FIG. 2 is a table illustrating example channel update intervals in accordance with some aspects of the present disclosure. The left column of table 200 lists channel names and the right column lists corresponding channel update intervals in units of seconds. The corresponding update frequency for each channel is equal to 1/(update interval). In an example implementation of system 100 of FIG. 1, mobile device 110 may subscribe to all four of the channels listed in table 200: Weather, Sports, News, and Stock Quotes. The system 100 may determine an update interval for updating content on mobile device 110 based, at least in part, on the information included in table 200. For example, the system 100 may identify that the channel with the smallest update interval (i.e. the most frequent update frequency) is the channel Stock Quotes, which has an update interval of 300 seconds. The system 100 may then update all channels on the mobile device every 300 seconds during some selected time period. The system 100 may determine, for example at 2:00 pm, that the mobile device will request updates for all four channels at 2:05 pm (300 seconds later). The update intervals in table 200 may be valid for a designated time period, such as 1 hour, and the update interval determined for the mobile device may be identified as valid for the designated time period. In the above example, the update interval of 300 seconds may be identified as valid until 3:00 pm, and the system 100 may update content on mobile device 110 every 300 seconds at least until 3:00 pm. Alternatively, the update interval may be reconfirmed (or changed) every time new content updates are sent, at some other predetermined interval, or sporadically, or the update interval may simply remain at a given interval until a new update interval is identified or received.

Information included in table 200 may be stored as data located on external server 174, server 104 or on mobile device 110, and the data may, in some implementations, be remotely accessible, for example, by internet 170 or wireless network 106. Data included on mobile device 110 or on server 104 may comprise pointers or links to locations in local or remote memory where the update information included in table 200 may be stored. A client or server may directly read the update interval data or the update interval data may be received from a remote source. Table 200 is only intended to illustrate examples of channel names and corresponding update intervals. Table 200 does not illustrate the breadth of channel content or update intervals that may be used in the system 100. Indeed, a wide variety of channel content may be implemented, and update intervals may be much longer (e.g. 1 millisecond) or much shorter than any of the values listed in table 200. Table 200 may be incorporated into the feed store 114 or local data 112 described in FIG. 1.

Figure 3:
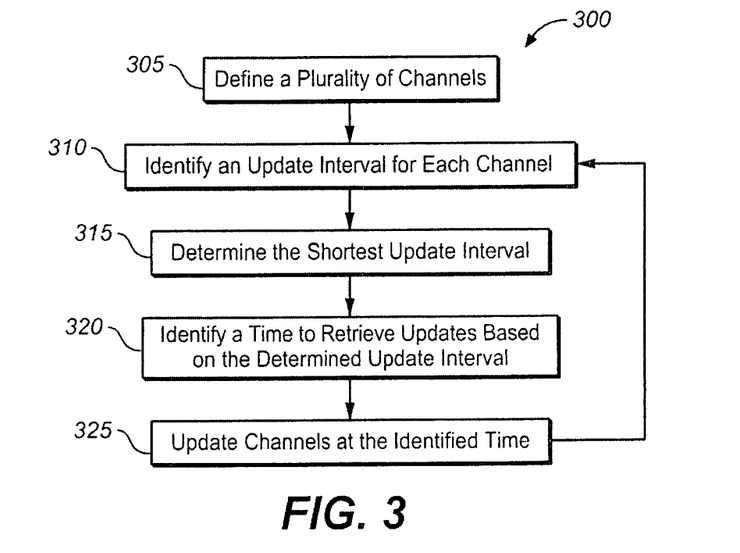
FIG. 3 is a flow chart illustrating an example method of updating data on a mobile device in accordance with some aspects of the present disclosure.

FIG. 3 is a flow chart illustrating an example process 300 of updating data on a mobile device in accordance with some aspects of the present disclosure. Generally, the process 300 may be used to determine an update interval or an update time for updating content on a mobile device. More particularly, the process 300 may be used to determine when a mobile device will request updated channel content. For example, process 300 may be implemented by the system 100 of FIG. 1 for updating data on mobile device 110. All or part of process 300 may be implemented automatically by the appropriate entities.

Different aspects of process 300 may be performed by different components of system 100 in various implementations. For example, some aspects may be implemented by either a client 102 or a server 104, as appropriate in the particular implementation. Some aspects may be implemented collaboratively between components, for example, over wireless network 106 or internet 170. Some examples are given as to where certain aspects may be implemented, but the examples are not intended to serve as an exhaustive list of possibilities. Indeed, it is contemplated that process 300 may be implemented by a variety of elements operating in a variety locations either collaboratively or in isolation.

At 305, a plurality of channels are defined. Multiple available channels may be offered by a wireless service provider or by a third party service provider. Mobile devices may then subscribe to, or register to receive channel updates for, some or possibly all of the available channels. The plurality of channels may be defined by a remote server or by the mobile device itself. For example, the channels may be defined by storing data on the mobile device identifying which channels the mobile device subscribes to and/or by allocating memory on the mobile device for each of the plurality of channels. Each channel may be adapted to receive a predetermined type of content, such that the content may be accessed on the mobile device. For example, the channels News and Baseball Scores may be defined at 305. Content for channels may be received, for example, by client 102 from server 104 over wireless network 106. The content may include media or multimedia data. Additionally, the content may include data defining user interfaces, menus, channel features, and the like. Channel content may be in a variety of formats such as text, images, vector graphics, bitmaps, frame-based animation, video, or in any other format. Channel content may further include executable scripts or other sequences of instructions. The channel content may be read by a media player component and displayed or otherwise presented on the mobile device. As a specific example, the channel Baseball Scores may receive text data identifying all of the Major League Baseball scores for a certain day. Channel data may include metadata that defines an update frequency for the channel.

At 310, an update interval for each channel is identified. The update interval for a channel may be determined by a content provider or a server associated with the wireless service provider. The update interval for one channel may be determined based upon the update interval for a different channel or upon a previous update interval for the same or a different channel. An update interval for a channel may be identified in update data or metadata previously sent from the server 102 to the client 104. An update interval may be based on a timestamp or other data describing when an update was previously received, transmitted or generated. Typically, different channels may have different update frequencies.

At 315, the shortest update interval is determined. The shortest update interval may be determined by a content provider, a server, or a mobile device. In some implementations, the server 104 may determine the shortest update interval and send an identification of the shortest update interval to the mobile device. In other implementations, update intervals other than the subscribed channel update intervals may be considered in determining the shortest update interval. For example, a user-preferred update interval may be considered in determining the shortest update interval. In other implementations, network bandwidth or network volume may be considered in determining the shortest update interval.

At 320, a time to retrieve updates based on the determined update interval may be identified. The time to retrieve updates may be identified by a content provider, a server, or a mobile device. In some implementations, the server may determine the time to retrieve updates, and the server may send an identification of the time to retrieve updates to the mobile device. In other implementations, the mobile device may identify the update time based on a shortest update interval sent from the server. Generally, the time to retrieve updates may be calculated, for example by the client device or the server, by adding the amount of time corresponding to the shortest update interval to the current time, or to the time of a previous update time.

At 325, channels are updated at the identified time. Updating channels may include transmitting data over wireless network 106 from server 104 to client 102 to update data in the feed store 114 of mobile device 110. Updating channels may also include updating data in the feed servers 122 of server 104. After the channels are updated, the process 300 may return to operation 310. Although it is not illustrated in the flow chart, there may be circumstances where the process 300 needs to restart at 305. For example, if a user decides to change channel subscriptions, process 300 may restart at 305.

Figure 4:
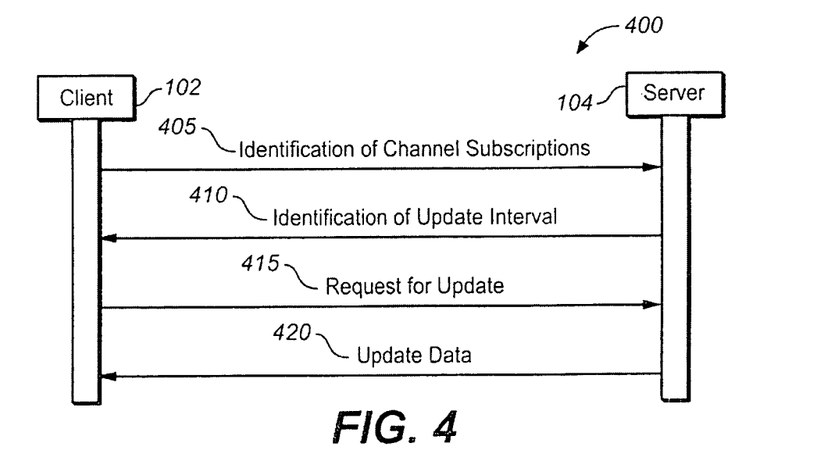
FIG. 4 is a diagram illustrating an example choreography for updating data on a mobile device in accordance with some aspects of the present disclosure.

FIG. 4 is a signaling and flow diagram illustrating an example message exchange 400 for updating data on a mobile device in accordance with some aspects of the present disclosure. The exchange 400 may generally take place between a client and a server. More particularly, the exchange 400 may take place via communications transmitted over wireless network 106 between client 102 and server 104. For example, exchange 400 may be part of a process implemented by the system 100 of FIG. 1 to update data on mobile device 110.

Message exchange 400 begins at 405, where client 102 sends an identification of channel subscriptions to server 104. At 410, client 102 receives an identification of an update interval. At 415, client 102 sends a request for updates to server 104. At 420, client 102 receives update data from the server 104.

In some implementations of exchange 400, before the client sends a request for updates at 415, the client 102 may receive from the server 104 a new update interval (not illustrated). For example, if an update interval of 2 hours was received at 410, the client 102 may receive a new update interval of 10 seconds before the client 102 sends the request for update at 415. The new update interval may be sent in various situations, for example, in the case that content provider 118 or server 104 identifies a high priority or unexpected update that needs to be sent to client 102 before the next scheduled update. Alternatively, in the case of high priority data, instead of sending a new update interval, an instruction to request either an immediate update or an update sooner than the next scheduled update time may be sent to the client 102.

The preceding flowcharts and accompanying descriptions illustrate example methods. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The described techniques may be implemented in non-mobile environments (e.g., using wire-line communications, such as a cable connection, with a non-mobile client, such as a set-top box).

What is claimed is:

1. A method for updating data on a remote device, the method comprising:
defining a plurality of channels on a remote device, each channel associated with a predetermined category of content, the content including information delivered to the remote device over a wireless network and stored on the remote device for displaying on the remote device, wherein content updates for the plurality of channels are automatically delivered to the remote device over the wireless network;
identifying an update frequency for each channel, wherein the update frequency for a channel corresponds to a time interval for delivering the content updates for the channel;
determining a most frequent update frequency among the plurality of channels defined on the remote device; and
requesting the content updates for the plurality of channels according to the most frequent update frequency.

2. The method of claim 1 wherein the update frequency for at least one channel is automatically adjusted based on the content.

3. The method of claim 1 wherein requesting the content updates for the plurality of channels includes sending an update request to a remote server according to the most frequent update frequency.

4. The method of claim 3 further comprising:
identifying a next update time corresponding to the most frequent update frequency; and
receiving a message at the remote device to send an update request for at least one channel before the next update time.

5. The method of claim 3 wherein content updates are automatically delivered to the remote device in response to automatically sending the update request according to the most frequent update frequency.

6. The method of claim 1 further comprising:
identifying a plurality of update frequencies for at least one of the plurality of channels, wherein each of the plurality of update frequencies corresponds to a different condition; and
updating the most frequent update frequency based on the identified plurality of update frequencies.

7. An article comprising a computer-readable storage medium storing instructions for causing data processing apparatus to perform operations comprising:
- identifying a subset of a plurality of available channels, the subset of channels including at least two of the available channels, each channel associated with a category of content, the content including information for storage on a mobile device for presentation to a user of the mobile device, the mobile device registered to receive content updates for the subset of channels, the content updates delivered to the mobile device over a wireless network;
- identifying a predetermined update frequency for each channel, the update frequency for a channel corresponding to a time interval for delivering the content updates for the channel;
- determining a most frequent update frequency among the subset of channels; and
- providing the content updates to the mobile device for the subset of channels according to the most frequent update frequency.

8. The article of claim 7 wherein the computer-readable storage medium stores instructions for causing data processing apparatus to further perform operations comprising:
- identifying a plurality of subsets of channels, at least one mobile device registered to receive content updates for each subset of channels;
- determining a most frequent update frequency for each of the subsets of channels; and
- providing content updates to each mobile device according to the most frequent update frequency for the subset of channels to which the mobile device is registered.

9. The article of claim 7 wherein the content updates are adapted for storage in a data storage on the mobile device for selective retrieval by a user of the mobile device.

10. The article of claim 9 wherein the computer-readable storage medium stores instructions for causing data processing apparatus to further perform operations comprising instructing the mobile device to request content updates at the most frequent update frequency.

11. The article of claim 10 wherein the content updates are provided in response to requests received from the mobile device.

12. The article of claim 10 wherein instructing the mobile device to request content updates at the most frequent update frequency comprises transmitting an instruction accompanying a content update.

13. The article of claim 7 wherein the computer-readable storage medium stores instructions for causing data processing apparatus to further perform operations comprising:
- receiving an adjustment to a predetermined update frequency for one or more channels;
- determining a new most frequent update frequency among the subset of channels based on the adjustment; and
- providing content updates to the mobile device for the subset of channels according to the new most frequent update frequency.

14. The article of claim 13 wherein the adjustment is based on content for the one or more channels.

15. The article of claim 7 wherein the computer-readable storage medium stores instructions for causing data processing apparatus to further perform operations comprising:
- receiving new content from an external source; and
- generating a content update for at least one channel based on the new content.

16. A system comprising:
- at least one database configured to store content for a plurality of available channels, each of the available channels associated with a category of content, the content including one or more files for delivery to remote devices based on a registration of each remote device to receive updates for one or more channels;
- one or more servers configured to:
  - automatically deliver content updates to remote devices over a wireless network based on the registration of each remote device to receive content updates for one or more channels;
  - calculate an update frequency for each remote device, the update frequency corresponding to a time interval for delivering the content updates to the remote device, the update frequency representing a most frequent update frequency among the one or more channels to which the remote device is registered.

17. The system of claim 16 wherein the one or more servers are further configured to send instructions to the remote devices to request content updates according to the update frequency.

18. The system of claim 16, wherein the one or more servers are further configured to adjust the update frequency in response to a change to a recommended update frequency for one or more of the channels.

19. The system of claim 18 wherein the change to the recommended update frequency for one or more of the channels is based on content in a content update for the one or more channels.

20. The system of claim 19 wherein the change to the recommended update frequency for one or more of the channels is based on a predetermined condition.

* * * * *